(12) United States Patent  (10) Patent No.: US 9,563,333 B2
Kaprani et al.  (45) Date of Patent: *Feb. 7, 2017

(54) CONTROLLING COMPUTER-BASED INSTANCES

(71) Applicant: International Business Machines Corporation, Armonk, NY (US)

(72) Inventors: Hema J. Kaprani, Bangalore (IN); Vinay V. Peshave, Bangalore (IN); Anand G. Umbare, Pune (IN); Dinesh G. Wadekar, Pune (IN)

(73) Assignee: International Business Machines Corporation, Armonk, NY (US)

(*) Notice: Subject to any disclaimer, the term of this patent is extended or adjusted under 35 U.S.C. 154(b) by 295 days.

This patent is subject to a terminal disclaimer.

(21) Appl. No.: 14/249,800

(22) Filed: Apr. 10, 2014

(65) Prior Publication Data
US 2014/0223371 A1   Aug. 7, 2014

Related U.S. Application Data

(63) Continuation of application No. 12/882,231, filed on Sep. 15, 2010, now Pat. No. 8,751,951.

(51) Int. Cl.
*G06F 3/0482* (2013.01)
*G06F 9/48* (2006.01)
(Continued)

(52) U.S. Cl.
CPC .......... *G06F 3/0482* (2013.01); *G06F 3/0481* (2013.01); *G06F 3/0487* (2013.01);
(Continued)

(58) Field of Classification Search
CPC .. G06F 3/0481; G06F 3/0482; G06F 3/04817; G06F 3/0487; G06F 3/04842; G06F 9/48
See application file for complete search history.

(56) References Cited

U.S. PATENT DOCUMENTS 5,664,133 A * 9/1997 Malamud .............. G06F 3/0482
 345/902
5,694,561 A  12/1997 Malamud et al.
(Continued)

OTHER PUBLICATIONS

Kumar, M. et al., "EyeExpose: Switching Applications with Your Eyes", http://hci.stanford.edu/cstr/reports/2007-02.pdf.
(Continued)

*Primary Examiner* — Nicholas Ulrich
(74) *Attorney, Agent, or Firm* — Maeve M. Carpenter; Maxine L. Barasch; Keohane & D'Alessandro PLLC

(57) ABSTRACT

In general, embodiments of the present invention provide an approach to control computer-based interfaces from anywhere in a GUI (e.g. a window, a desktop, etc.) regardless of the fixed position of the instances. Specifically, using a pointing device or the like (e.g., by right clicking), a user can activate an instance control function that allows the user to open an instance, close an instance, and/or or switch between running instances. Along these lines, the instance control function can be activated by interacting with an icon, a window (e.g., corresponding a folder or a running instance), or a desktop. Once activated, the instance control function allows the user full control over instances.

19 Claims, 7 Drawing Sheets

(51) Int. Cl.
  *G06F 3/0481* (2013.01)
  *G06F 3/0487* (2013.01)
  *G06F 3/0484* (2013.01)
(52) U.S. Cl.
  CPC ...... *G06F 3/04817* (2013.01); *G06F 3/04842* (2013.01); *G06F 9/48* (2013.01)

(56) References Cited

U.S. PATENT DOCUMENTS

| | | | |
|---|---|---|---|
| 6,025,841 | A | 2/2000 | Finkelstein et al. |
| 6,590,596 | B1 | 7/2003 | Rector |
| 6,609,146 | B1 | 8/2003 | Slotznick |
| 6,781,611 | B1 | 8/2004 | Richard |
| 7,434,177 | B1 | 10/2008 | Ording et al. |
| 2003/0117440 | A1 | 6/2003 | Hellyar et al. |
| 2007/0157099 | A1 | 7/2007 | Haug |
| 2007/0157125 | A1* | 7/2007 | Peters ............... G06F 3/0482 715/837 |
| 2007/0245256 | A1* | 10/2007 | Boss ............... G06F 3/0481 715/768 |
| 2008/0052642 | A1 | 2/2008 | Champion et al. |
| 2008/0155455 | A1 | 6/2008 | Balasubramanian |
| 2008/0155477 | A1 | 6/2008 | Bocking |
| 2010/0088628 | A1 | 4/2010 | Flygh et al. |
| 2010/0313165 | A1 | 12/2010 | Louch et al. |
| 2011/0087989 | A1* | 4/2011 | McCann ............. G06F 3/04817 715/772 |

OTHER PUBLICATIONS

Wilkinson, B., "Taking Control: Managing the Taskbar", http://scscc:com/bkk/Taskbar,%20Managing%20the.pdf.
James et al., Direct Access to Contained Objects via Pop-Up (Context Menus), Dec. 1993, IBM Technical Disclosure Bulletin vol. 36, No. 12, pp. 167-168.
"Start or Switch", Apr. 16, 2002, http://www.freedownloadscenter.com/Shell_and_Desktop/Context_Menu_Enhancements/Start_Or-Switch.html, (Retrieved Apr. 13, 2012 using Wayback Machine, http://web.archive.org).
Quick Launch Bar and Start Menu Replacement, www.contextmagic.com, Mar. 17, 2009, retrieved Nov. 19, 2012 using wayback,archive.org.
Nicholas S. Ulrich, USPTO Office Action, U.S. Appl. No. 12/882,231, Mail Date Apr. 17, 2012, 18 pages.
Nicholas S. Ulrich, USPTO Final Office Action, U.S. Appl. No. 12/882,231, Mail Date Sep. 14, 2012, 13 pages.
Nicholas S. Ulrich, USPTO Office Action, U.S. Appl. No. 12/882,231, Mail Date Nov. 27, 2012, 11 pages.
Nicholas S. Ulrich, USPTO Final Office Action, U.S. Appl. No. 12/882,231, Mail Date Apr. 15, 2013, 19 pages.
Nicholas S. Ulrich, USPTO Notice of Allowance and Fee(s) Due, U.S. Appl. No. 12/882,231, Mail Date Jan. 27, 2014, 16 pages.

* cited by examiner

CONTROLLING COMPUTER-BASED INSTANCES

RELATED U.S. APPLICATION DATA

The present patent document is a continuation of U.S. patent application Ser. No. 12/882,231, filed Sep. 15, 2010, entitled "CONTROLLING COMPUTER-BASED INSTANCES", the disclosure of which is incorporated herein by reference.

TECHNICAL FIELD

The present invention relates to instance control. Specifically, the present invention relates to the creation, closing, and/or switching between of computer-based instances (e.g., application instances, folder instances, etc.).

BACKGROUND OF THE INVENTION

Graphical User Interfaces (GUIs) are a key part of any computer experience. In a typical arrangement, a user will view and interact with icons to control/manipulate various applications. For example, an operating system may provide a background or desktop from which various application/program instances can be interacted with. Along these lines, it is common for a user to switch between different opened applications. If the user diverts to another task, then the previous application will be minimized.

The traditional method for switching, invoking, or closing the application instances is to navigate a pointing device or the like to the bottom of the screen and choose the particular application window from a task bar. Under this methodology, each time the user wants to invoke/switch to other application instance, he/she needs to go to the task bar. Among other things, the taskbar approach is not only spatially inefficient, but it also does not allow for full instance control (e.g., invoking of new instances). In view of the foregoing, there exists a need for a solution that overcomes the deficiencies in the related art.

SUMMARY OF THE INVENTION

In general, embodiments of the present invention provide an approach to control computer-based interfaces from anywhere in a GUI (e.g. a window, a desktop, etc.) regardless the fixed position of the instances. Specifically, using a pointing device or the like (e.g., by right clicking), a user can activate an instance control function that allows the user to open an instance, close an instance, and/or or switch between running instances. Along these lines, the instance control function can be activated by interacting with an icon, a window (e.g., corresponding a folder or a running instance), or a desktop. Once activated, the instance control function allows the user full control over instances.

A first aspect of the present invention provides a method for controlling computer-based instances, comprising: receiving a selection of a Graphical User Interface (GUI) object within a GUI for a computer; displaying a list of computer-based instances corresponding to the GUI object in the GUI; receiving a selection of an instance in the list of computer-based instances, the selection indicating a desired action for the instance; and controlling the instance based upon the desired action.

A second aspect of the present invention provides a method of controlling computer-based instances, comprising: receiving a selection of a Graphical User Interface (GUI) object within a GUI of a computer; displaying a window that includes an instance controlling option in response to the selection of the GUI object; displaying a list of instance control options in response to a selection of the instance controlling option in the window; and performing an instance control action in response to selection of one of the instance control options.

A third aspect of the present invention provides a system for controlling computer-based instances, comprising: a bus; a processor coupled to the bus; and a memory medium coupled to the bus, the memory medium comprising instructions to: receive a selection of a Graphical User Interface (GUI) object within a GUI for a computer; display a list of computer-based instances corresponding to the GUI object in the GUI; receive a selection of an instance in the list of computer-based instances, the selection indicating a desired action for the instance; and control the instance based upon the desired action.

A fourth aspect of the present invention provides a computer program product for controlling computer-based instances, the computer program product comprising a computer readable storage media and program instructions stored on the computer readable storage media, to: receive a selection of a Graphical User Interface (GUI) object within a GUI for a computer; display a list of computer-based instances corresponding to the GUI object in the GUI; receive a selection of an instance in the list of computer-based instances, the selection indicating a desired action for the instance; and control the instance based upon the desired action.

A fifth aspect of the present invention provides a method for deploying a system for controlling computer-based instances, comprising: providing a computer infrastructure being operable to: receive a selection of a Graphical User Interface (GUI) object within a GUI for a computer; display a list of computer-based instances corresponding to the GUI object in the GUI; receive a selection of an instance in the list of computer-based instances, the selection indicating a desired action for the instance; and control the instance based upon the desired action.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach to control computer-based interfaces from anywhere in a GUI (e.g. window, a desktop, etc.) regardless of the fixed position of the instances. Specially, using a pointing device or the like (e.g., by right clicking), a user can activate an instance control function that allows the user to open an instance, close an instance, and/or or switch between running instances. Along these lines, the instance control function can be activated by interacting with an icon, a window (e.g., corresponding a folder or a running instance), or a desktop. Once activated, the instance control function allows the user full control over instances.

It is understood that although "interacting" with an icon, title bar, window, desktop, etc., can comprise a right click of a pointing device, this need not be the case. Rather, any type of interaction that would result in the display of menu 50 or 50A could be performed hereunder. Examples include, but are not limited to, a keystroke, a certain directional movement of the pointing device, a sequence of clicks of any mouse button or fly wheel, etc.

Figure 1:
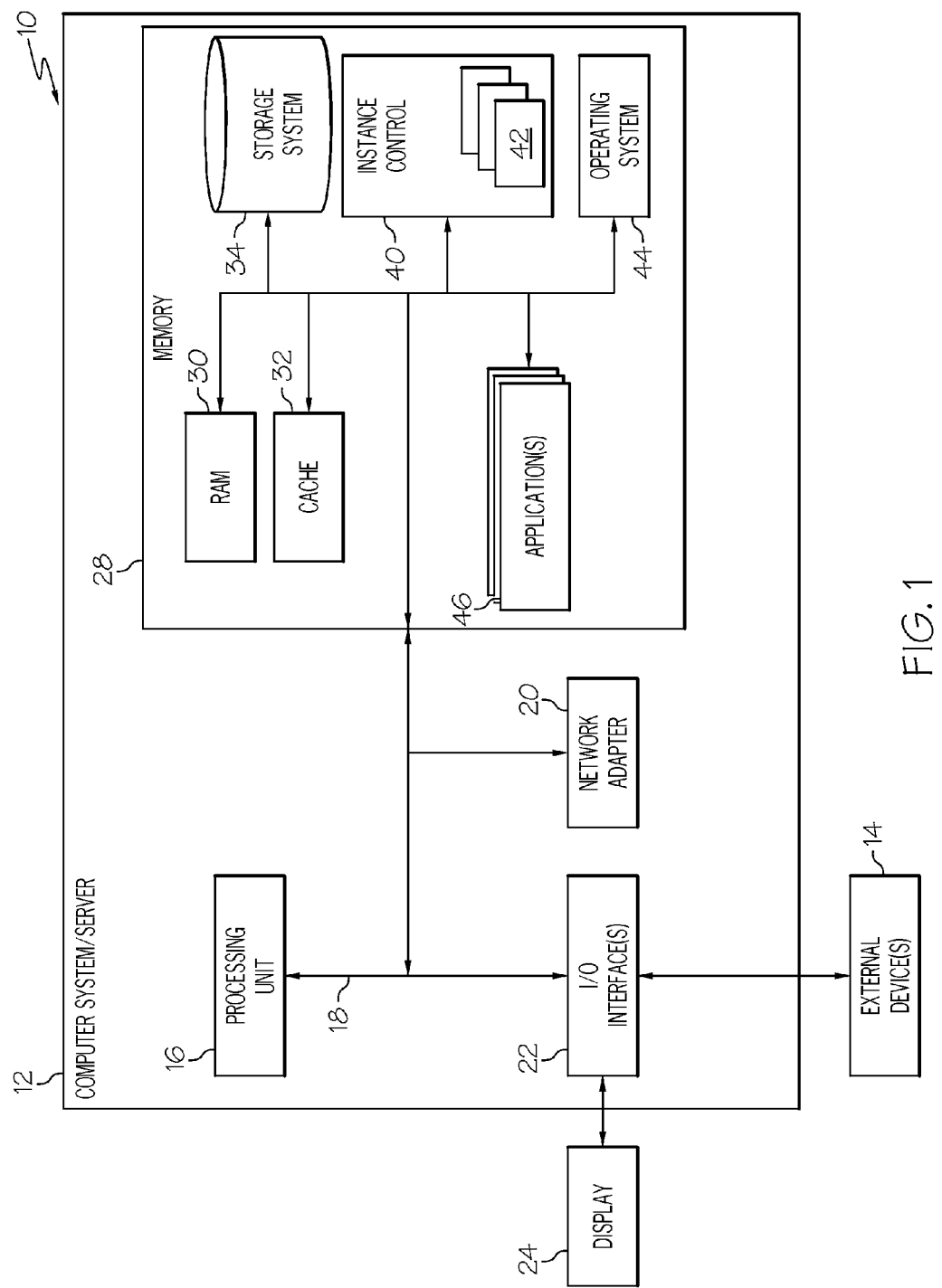
FIG. 1 depicts a computer system having an instance control program according to an embodiment of the present invention.

Referring now to FIG. 1, a schematic of an example of a system 10 for controlling computer-based instances is shown. As depicted, system 10 comprises a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product such as instance control program 40 having a set (e.g., at least one) of program modules 42 that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

As shown, instance control program 40 may be stored in memory 28 by way of example, and not limitation, as well as operating system 44, one or more application programs 46, other program modules, and program data. Each of the operating system 44, one or more application programs 46, other program modules, and program data or some combination thereof, may include an implementation of a networking environment. Program modules 42 generally carry out the functions and/or methodologies of embodiments of the invention as described herein. It is understood that instance control program 40 generally allows a user to control instances such as application instances (e.g., provided by application(s) 46), folder instances (e.g., provided by operating system 44), etc. Along these lines, instance control program 40 could be realized as an independent program that works in conjunction with operating system 44 and/or application(s) 46. Alternatively, instance program 40 could be incorporated as part of application(s) 46 and/or operating system 44 (e.g., as a plug-in or the like).

Regardless, computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
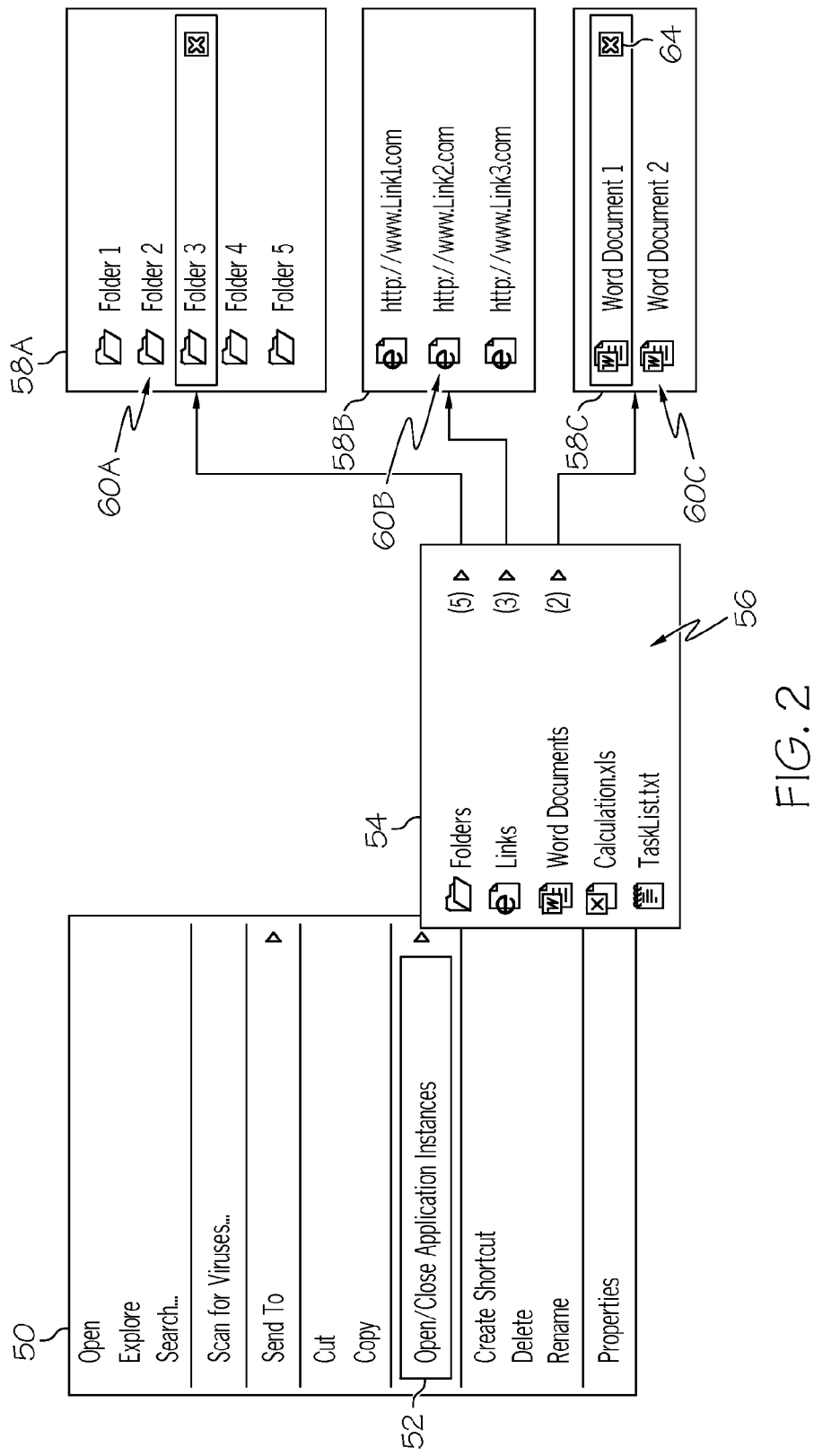
FIG. 2 depicts an instance control option according to an embodiment of the present invention.

Referring now to FIG. 2, the instance control functionality of the present invention will be explained. As shown, when a user so chooses (e.g., by right-clicking on a desktop), a menu/window 50 will be displayed in which instance control function 52 is provided (e.g., by instance control program 40 of FIG. 1). When a user selects instance control function 52, an instance window 54 will be displayed that includes a set (at least one) of instance categories 56 that are currently running in the system (assuming more than one type of instance is running; if only one type of instance is running, then selection of instance control function 52 could result in direct display of a corresponding instance list). The non-exhaustive examples shown in FIG. 2 include folders, links, documents, spreadsheets, lists, etc. By selecting one of the categories 56, corresponding lists 58A-C will be displayed that provide each individual instance 60A-C currently running. If the user selects a particular instance in a list 58A-C, the user can levy a desired action thereon. For example, the user could switch to that instance by clicking it, or close the instance by selecting an "X" button or the like when that instance is highlighted (e.g., by hovering over the instance with a pointing device). Similarly, if the user decides to open/launch a new instance, he/she can do so by right-clicking on the corresponding instance category 56 in instance window 54 and selecting "new" (not shown).

The embodiments of the present invention allow for multiple cases/scenarios for activating the instance control function of the present invention. That is, the user can integrate with the instance control function by interacting with icons, folders, windows, or the computer desktop. Shown below are various illustrative cases provided by the embodiments of the present invention:

If an Icon is Selected

Case 1—Desktop Screen-->Right click on the application icon-->Click "Open/Close Application Instances" will display multiple opened instances for applications selected.

Case 2—Quick Launch-->Right click on the application icon-->Click "Open/Close Application Instances" will display multiple opened instances for applications selected.

Case 3—Inside any folder-->Right click on the application icon-->Click "Open/Close Application Instances" will display multiple opened instances for applications selected.

If an Icon is not Selected:

Case 1—Desktop Screen-->Right click anywhere in the screen-->Click "Open/Close Application Instances" will display multiple opened instances for different applications.

Case 2—Window Title Bar-->Right click anywhere in the bar-->Click "Open/Close Application Instances" will display multiple opened instances for different applications.

Case 3—Inside any folder-->Right click anywhere in the folder-->Click "Open/Close Application Instances" will display multiple opened instances for different applications.

In one embodiment, the "Open/Close Application instances" option will be visible when there is at least a single instance opened for any application. Any instance or group of instances can be closed just by clicking "X" button, which will be visible when a specific instance is highlighted (e.g., when a pointer device is hovered over the instance).

Among other things, under these teachings:

1) There is no need to invoke/close the application or instances from a single point (e.g., a taskbar)

2) The user can switch/invoke or close any opened application instances by checking that application icon at any place in the system.

3) The user can switch/invoke or close different opened application instances through any opened window.

4) The user can see opened application instances anywhere in the system.

5) New options will be available on demand.

6) Opened instances count will help to know the number of instances opened.

7) An on-the-fly "close" button can be provided and will save time in closing the application by conventional/traditional method.

8) It will be user friendly to display the instances in an organized manner.

Figure 3:
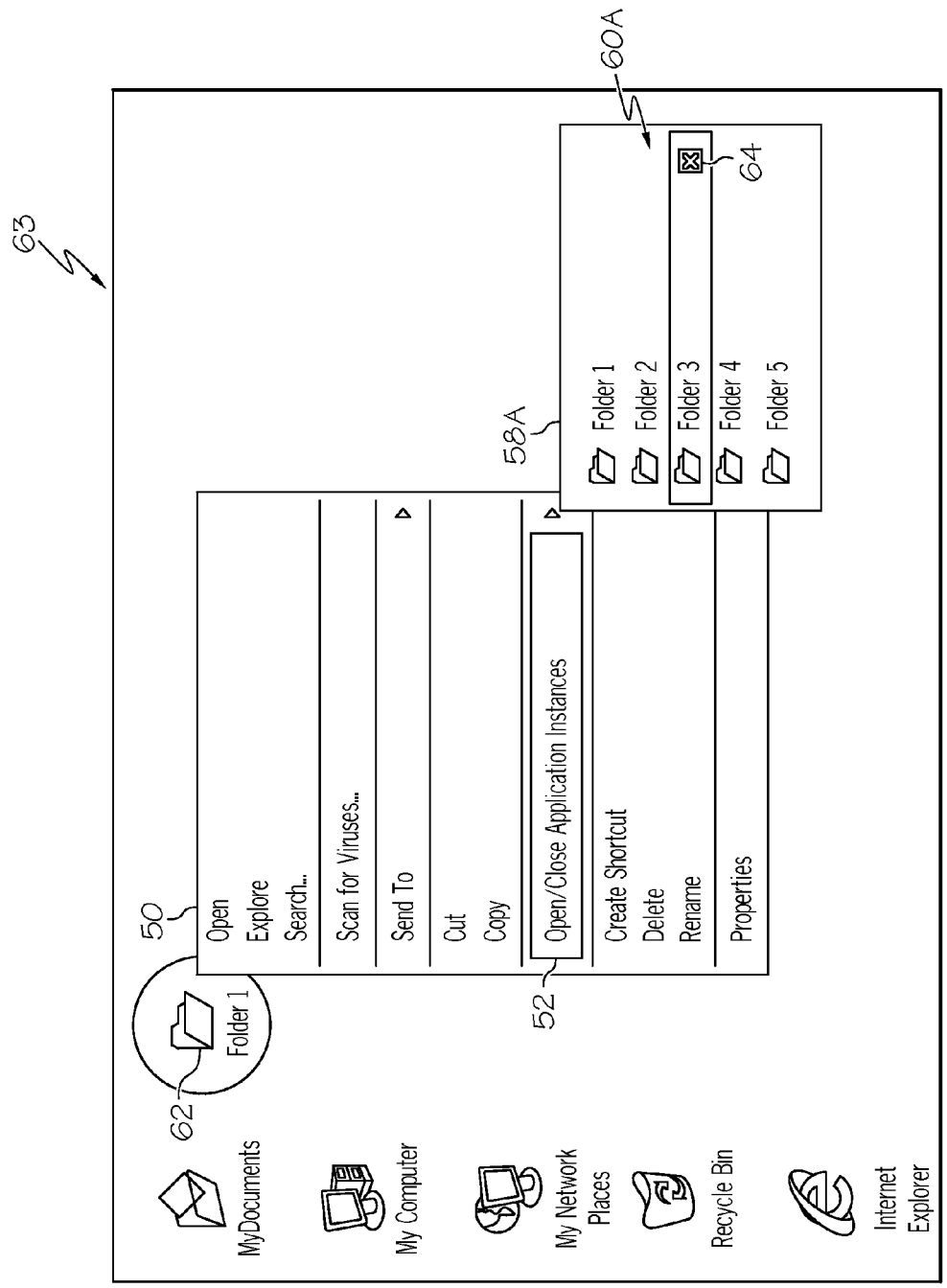
FIG. 3 depicts a selected folder instance according to an embodiment of the present invention.

Referring now to FIG. 3, an illustrative scenario pertaining to opened folders is shown. Specifically, if a user has many folders opened and wants to invoke/close/modify (interact with) a particular folder or content therein, the user can right-click on folder icon 62 on computer desktop 63 to cause menu 50 to be displayed. Once displayed, the user could select the instance control function 52 to cause folder list 58A containing folder instances 60A to be displayed. A user can then control a particular running instance by interacting with its counterpart in list 58A. As further shown, the user has highlighted the "Folder 3" instance. Based on the user's desired action, the highlighted instance will be controlled accordingly. For example, if the user left clicks on "Folder 3", then "Folder 3" will be displayed/switched to. Conversely, if the user clicks the "X" button 64 for "Folder 3", then "Folder 3" will be closed.

Figure 4:
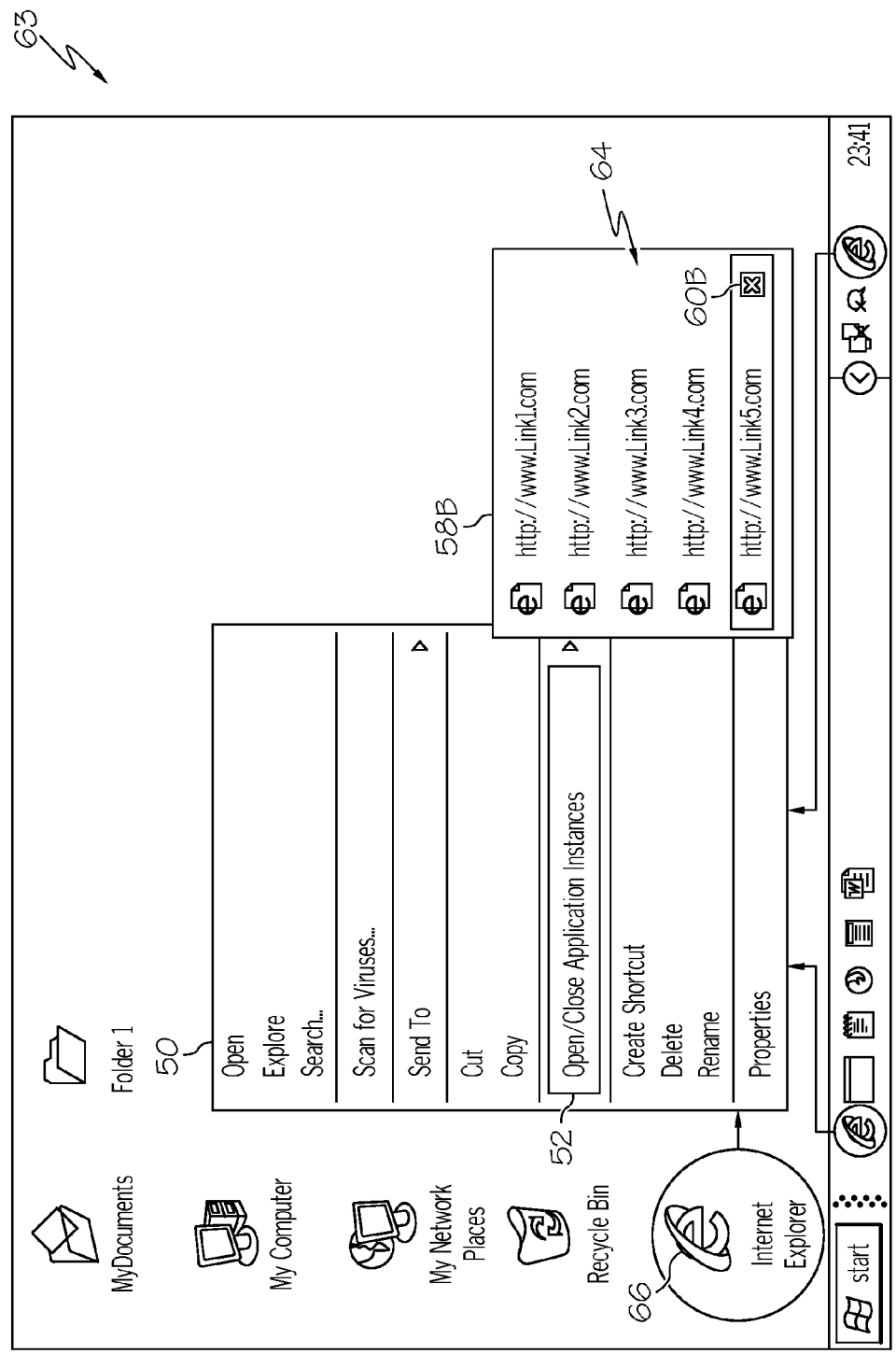
FIG. 4 depicts a selected hyperlink instance according to an embodiment of the present invention.

A similar practice could be implemented for any type of instance. Referring to FIG. 4 (for example), if a user has many instances of a browser open, and he/she wishes to interact with a particular one, the user can right-click on browser icon 66 to cause menu 50 to be displayed. Once displayed, the user could select the instance control function 52 to cause link/browser list 58B containing browser/link instances 60B to be displayed. A user can then control a particular running instance by interacting with its counterpart in list 58B. As further shown, the user has highlighted the "Link5" instance. Based on the user's desired action, the highlighted instance will be control accordingly. For example, if the user left clicks on "Link5", then "Link5" will be displayed/switched to. Conversely, if the user clicks the "X" button 64 for "Link5", then "Link5" will be closed.

Figure 5:
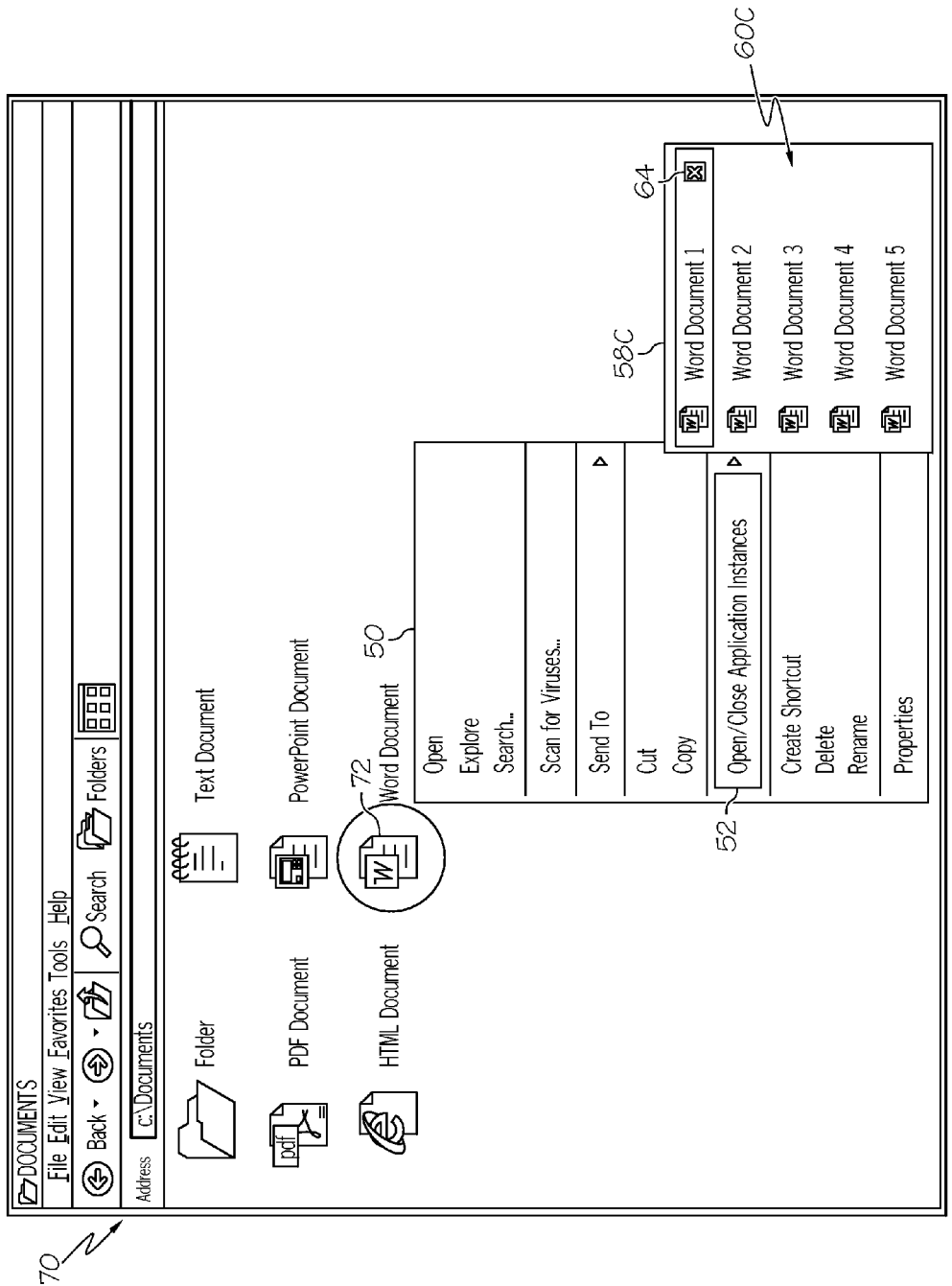
FIG. 5 depicts a selected application instance according to an embodiment of the present invention.

FIGS. 3 and 4 show icons 62 and 66 being interacted with (e.g., right clicked) on a computer desktop. However, this need not be the case. For example, referring to FIG. 5, it will be shown that icons could also be interacted with within a window 70. As shown, a user can interact with an icon 72 within window 70 to cause menu 50 having instance control function 52 to be displayed. Upon selecting instance control function 52, a document list 58C, corresponding to icon 72 will be displayed. As shown, document list 58C shows document instances 60C. A user can then control a particular running instance by interacting with its counterpart in list 58C. As shown, the user has highlighted the "Word® Document 1" instance. Based on the user's desired action, the highlighted instance will be control accordingly. For example, if the user left clicks on "Word® Document 1", then "Word® Document 1" will be displayed/switched to. Conversely, if the user clicks the "X" button 64 for "Word® Document 1", then "Word® Document 1" will be closed. Word, Excel, and related terms are trademarks of Microsoft, Inc. in the United States and/or other countries.

Figure 6:
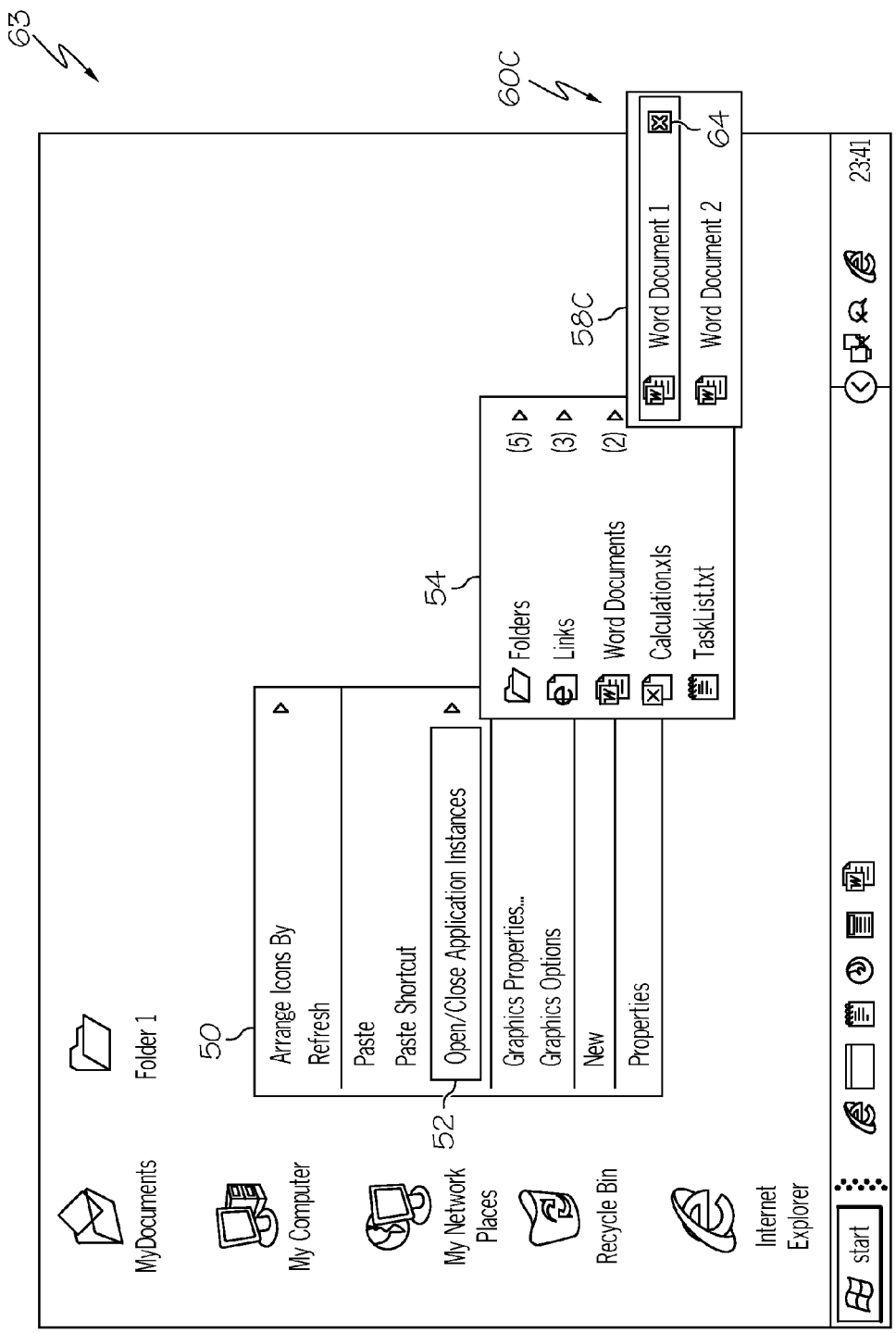
FIG. 6 depicts instances displayed pursuant to a selection of a computer desktop according to an embodiment of the present invention.

FIG. 6 shows that an icon need not be interacted with at all to access and/or provide the functions recited herein. As depicted, a user could interact with (e.g., right click on) computer desktop 63 to cause menu 50 having instance control function 52 to be displayed. Similar to that explained above, selection of instance control function 52 will result in display of instance window 54 having instance categories 56. User can then interact with one of the categories to cause a corresponding list 58C of instances 60C to be displayed. Once instance list 58C is displayed, the user can interact with accordingly to cause/invoke a particular desired action (e.g., switch to or close instance). Although instances shown in FIG. 6 are document instances, this need not be the case.

Figure 7:
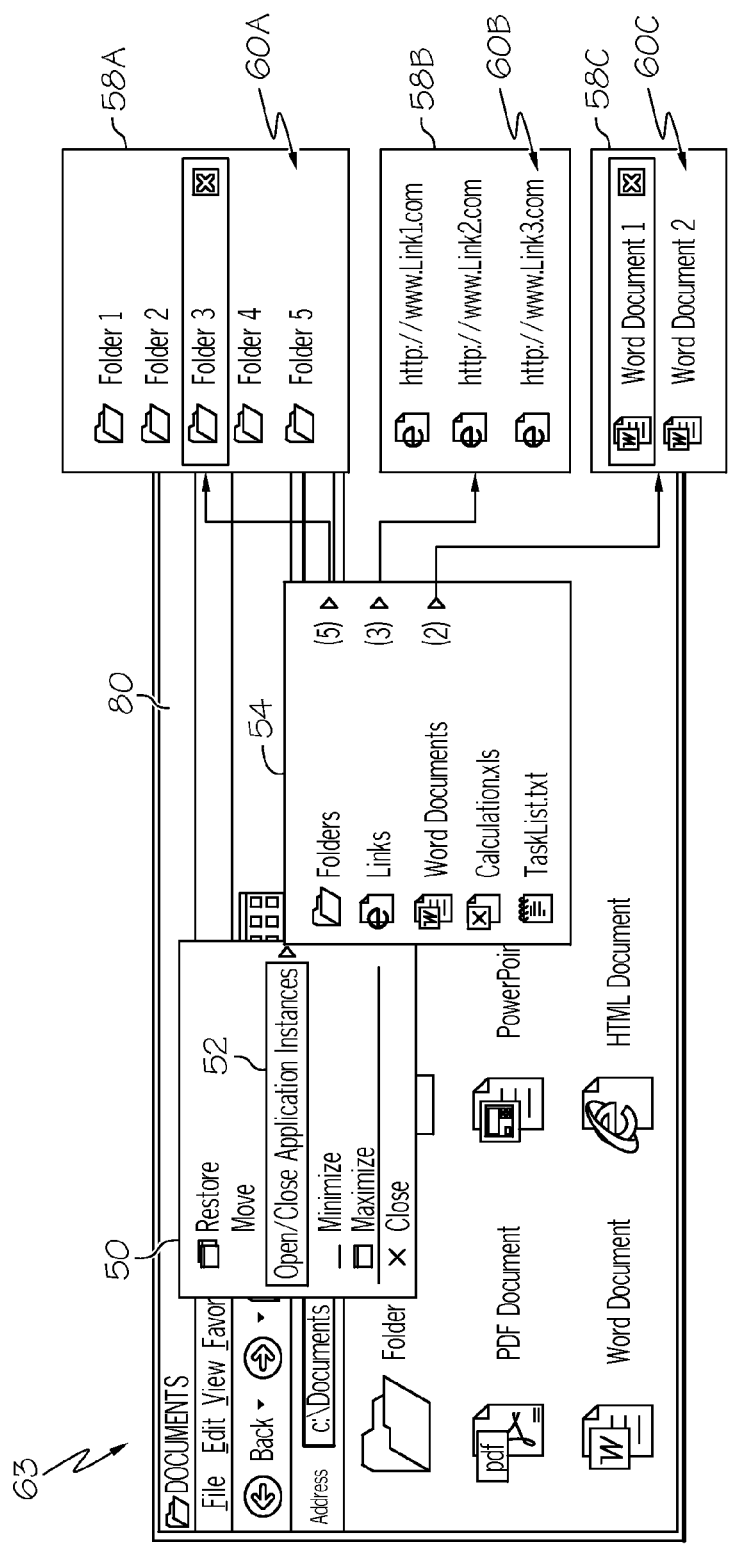
FIG. 7 depicts instances displayed pursuant to a selection of a title bar according to an embodiment of the present invention.

FIG. 7 demonstrates that similar functionality can be provided by interacting with (e.g., right clicking on) a title bar 80 of a window 70. As shown, such interaction results in display of a menu 50A including instance control function 52, the selection of which results in display of instance window 54 having instance categories 56 (assuming more than one type of instance is running). If only one type of instance is running, then selection of instance control function 52 could result in direct display of a corresponding instance list). Regardless, in the example shown, selection of an instance category will result in display of a set of lists 58A-C of corresponding instances 60A-C.

Based on the examples set forth above, module(s) 42 instance control program 40 can (among other things): receive a selection of a Graphical User Interface (GUI) object within a GUI for a computer; display a list of computer-based instances corresponding to the GUI object in the GUI; receive a selection of an instance in the list of computer-based instances, the selection indicating a desired action for the instance; and controlling the instance based upon the desired action.

Further, module(s) 42 can (among other things): receive a selection of a Graphical User Interface (GUI) object within a GUI of a computer; display a window that includes an instance controlling option in response to the selection of the GUI object; display a list of instance control options in response to a selection of the instance controlling option in the window; and perform an instance control action in response to selection of one of the instance control options.

While shown and described herein as an instance control solution, it is understood that the invention further provides various alternative embodiments. For example, in one embodiment, the invention provides a computer-readable/useable medium that includes computer program code to enable a computer infrastructure to provide instance control functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide instance control functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for instance control. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for controlling computer-based instances, comprising:
   receiving a selection of a Graphical User Interface (GUI) object within a GUI for a computer;
   in response to the receiving, displaying an instance control function comprising a point of access to a window comprising instance categories;
   determining whether an instance category of the instance categories is right-clicked or left-clicked;
   if the determination is that the instance category is right clicked, displaying an option to launch a new instance corresponding to the instance category, receiving a selection of the option, and launching the new instance; and
   if the determination is that the instance category is left-clicked, displaying a window comprising a list of computer-based instances corresponding to the instance category, receiving a selection of an instance from the list, wherein the selection indicates a desired action for the selected instance, and controlling the selected instance based upon the desired action.

2. The method of claim 1, the GUI object corresponding to at least one of the following: an application, a file, or a folder.

3. The method of claim 1, the GUI object being at least one of the following: a computer desktop or a title bar.

4. The method of claim 1, the GUI object being an icon.

5. The method of claim 4, the icon being located in at least one of the following locations within the GUI: the computer desktop, a tool bar displayed on the computer desktop, or within a folder stored on the computer.

6. The method of claim 1, the desired action comprising at least one of the following:
   closing the instance, switching to the instance, or launching a new instance.

7. The method of claim 1, wherein a service solution provider provides a computer infrastructure that performs the method for one or more consumers.

8. A system for controlling computer-based instances, comprising:
   a bus;
   a processor coupled to the bus; and
   a memory medium coupled to the bus, the memory medium comprising instructions to:
      receive a selection of a Graphical User Interface (GUI) object within a GUI for a computer;
      in response to the receiving, display an instance control function comprising a point of access to a window comprising instance categories;
      determine whether an instance category of the instance categories is right-clicked or left-clicked;
      if the determination is that the instance category is right clicked, display an option to launch a new instance corresponding to the instance category, receiving a selection of the option, and launching the new instance; and
      if the determination is that the instance category is left-clicked, display a window comprising a list of computer-based instances corresponding to the instance category, receive a selection of an instance from the list, wherein the selection indicates a desired action for the selected instance, and control the selected instance based upon the desired action.

9. The system of claim 8, the selection of the GUI object comprising a right click of a pointing device.

10. The system of claim 8, the GUI object corresponding to at least one of the following: an application, a file, or a folder.

11. The system of claim 8, the GUI object being at least one of the following: an icon, a computer desktop, or a title bar.

12. The system of claim 11, the icon being located in at least one of the following locations within the GUI: the computer desktop, a tool bar displayed on the computer desktop, or within a folder stored on the computer.

13. The system of claim 8, the desired action comprising at least one of the following: closing the instance, switching to the instance, or launching a new instance.

14. A computer program product for controlling computer-based instances, the computer program product comprising a computer readable storage media and program instructions stored on the computer readable storage media, to:
   receive a selection of a Graphical User Interface (GUI) object within a GUI for a computer;
   in response to the receiving, display an instance control function comprising a point of access to a window comprising instance categories;
   determine whether an instance category of the instance categories is right-clicked or left-clicked;
   if the determination is that the instance category is right clicked, display an option to launch a new instance corresponding to the instance category, receiving a selection of the option, and launching the new instance; and if the determination is that the instance category is left-clicked, display a window comprising a list of computer-based instances corresponding to the instance category, receive a selection of an instance from the list, wherein the selection indicates a desired action for the selected instance, and control the selected instance based upon the desired action.

15. The computer program product of claim 14, the selection of the GUI object comprising a right click of a pointing device.

16. The computer program product of claim 14, the GUI object corresponding to at least one of the following: an application, a file, or a folder.

17. The computer program product of claim 14, the GUI object being at least one of the following: an icon, a computer desktop, or a title bar.

18. The computer program product of claim 17, the icon being located in at least one of the following locations within the GUI: the computer desktop, a tool bar displayed on the computer desktop, or within a folder stored on the computer.

19. The computer program product of claim 14, the desired action comprising at least one of the following: closing the instance, switching to the instance, or launching a new instance.

* * * * *